United States Patent Office  3,478,308
Patented Nov. 11, 1969

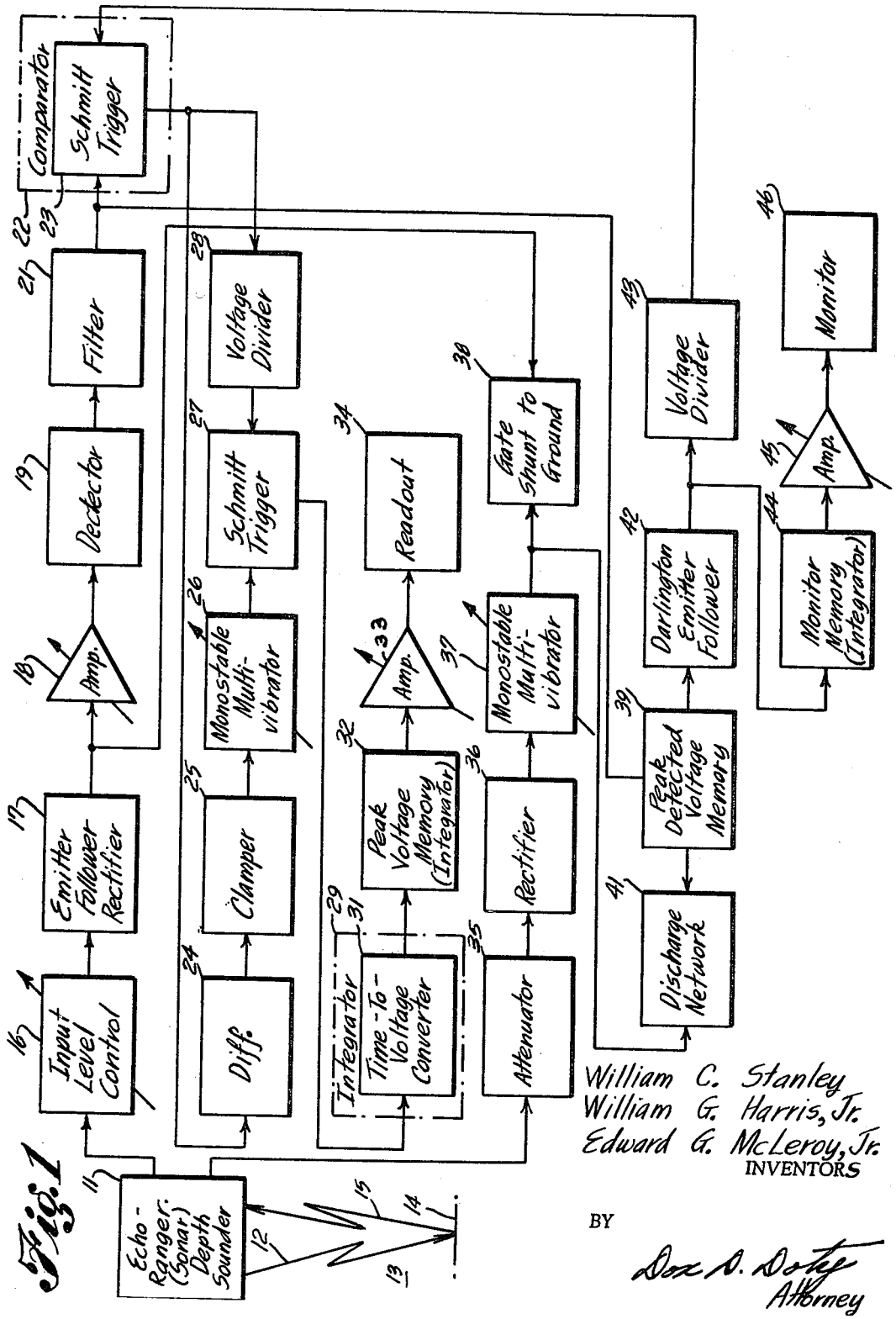

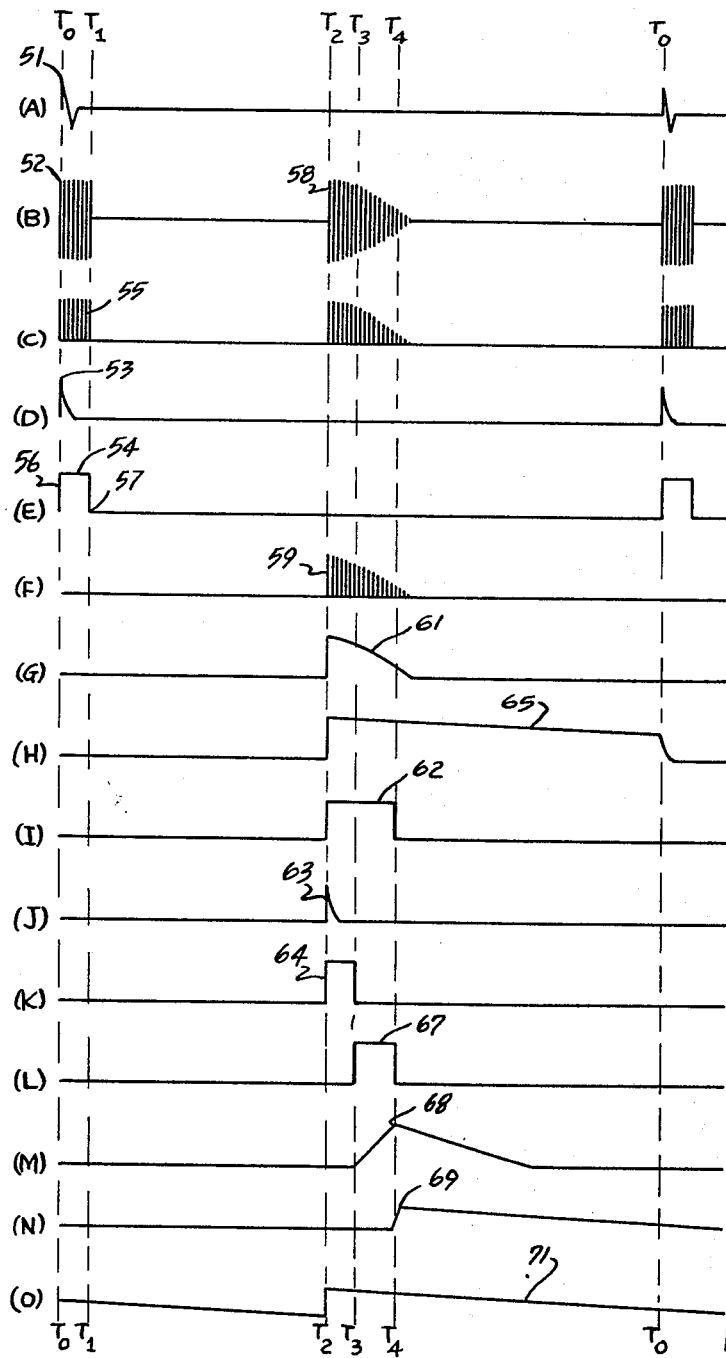

3,478,308
SEA BOTTOM CLASSIFIER
William C. Stanley, Panama City, William G. Harris, Jr., Titusville, and Edward G. McLeroy, Jr., Panama City, Fla., assignors to the United States of America as represented by the Secretary of the Navy
Filed Dec. 16, 1968, Ser. No. 783,898
Int. Cl. G01s 9/66; G10k 11/00; G01n 9/24
U.S. Cl. 340—3    14 Claims

ABSTRACT OF THE DISCLOSURE

An acoustical sea floor analyzer system is herewith disclosed which uses a depth sounder to actively broadcast sonic pulses toward a sea floor and to receive the echoes therefrom which, in turn, constitute data signals that represent physical characteristics thereof. Said data signals are then processed to ascertain the extent to which they were elongated relative to a predetermined reference parameter by their impact on and volume reflection from the sea floor being sensed, and the measured elongation thereof is read out in terms of floor softness.

---

The invention described herein may be manufactured and used by or for the Government of the United States of America for governmental purposes without the payment of any royalties thereon or therefor.

The present invention relates generally to parameter measuring and data processing systems and, in particular, is a rapid sampling instrument for continuously measuring and indicating the relative hardness or softness of the sea floor.

In the past, physical samples of a particular portion of the sea floor under consideration were obtained by corers or the like. They were then chemically or otherwise analyzed as necessary to determine their relative hardness, constituents, and any other characteristics of significance. Such procedures were, of course, laborious, time consuming, expensive, and ordinarily required a considerable amount of skill and apparatus. Obviously, however, they were quite satisfactory for many practical purposes and, thus, are still used to an advantage to date. On the other hand, in the event sea bottom hardness or softness alone is desired, or if desired information can readily be extrapolated or inferred therefrom, it may be seen that an improved method and means for so doing would, under certain circumstances, be an advancement in the art.

The subject invention constitutes just such an advancement in the art, inasmuch as it overcomes many of the disadvantages of the prior art. Although, to a certain extent, it involves rather sophisticated electronic and electroacoustical equipment, the overall system and operation costs of the instant invention are usually lower than those of the prior art, and it is considerably less difficult, laborious, and time consuming to operate.

It is, therefore, an object of this invention to provide an improved method and means for determining the hardness of the floor under a volume of water, such as a sea floor or the like.

Another object of this invention is to provide a new, unique, and improved sea bottom classifier.

Another object of this invention is to provide an acoustical method and means for rapidly analyzing the hardness and constituents of a sea floor.

Still another object of this invention is to provide a unique method and means for continuously classifying the sea bottom from a location remote therefrom, such as, for example, from a ship traveling on the water surface thereabove, a submarine boat, or possibly an aircraft capable of towing a suitable electroacoustical transducer in the water thereabove while flying above the surface thereof.

Still another object of this invention is to provide an improved method and means for detecting and classifying various and sundry objects laying on, partially buried in, or completely buried in a sea floor, river bottom, bay bottom, or other waterways.

A further object of this invention is to provide an improved material analyzer with an increased sampling rate.

A further object of this invention is to provide an improved method and means for distinguishing between mud and sand surfaces, regardless of the environmental medium within which they are located.

Still another object of this invention is to provide an improved method and means for continuously analyzing the hardness and constitutents of soil or other earth materials.

Another object of this invention is to provide an improved oceanographic instrument for measuring various and sundry submarine parameters from a position relatively remote therefrom or contiguously disposed therewith.

Other objects and many of the attendant advantages will be readily appreciated as the subject invention becomes better understood by reference to the following detailed description, when considered in conjunction with the accompanying drawings wherein:

FIG. 1 is a block diagram of a preferred embodiment of the system constituting the subject invention; and FIG. 2 is a graphical representation of idealized signal waveforms which are produced by the various components of the system of FIG. 1 at successive, respectively indicated times.

At this time, it would appear to be noteworthy that although the preferred embodiment of the invention disclosed herewith is a system to be operated substantially within water and, thus, may be considered to be a sonar system of sorts or an attachment thereto, it may also be used in any other predetermined environment, if it is properly designed to do so. Hence, this particular disclosure is not intended to limit the scope of the invention to sea floor analysis alone, but, instead, is intended to portray a method and means which facilitates the use thereof for material analysis purposes in any desired ambient environment. Obviously, it would be well within the purview of one skilled in the art to make whatever design changes are necessary to use the invention in conjunction with or within any preferred medium. Hence, it may be designed for operation in water, air, space, or any other suitable place.

Referring now to FIG. 1, there is shown an echo-search, echo-ranger, or sonar type device, such as, for example, a depth sounder 11, which broadcasts acoustical pulses 12 through sea water 13 (or other aqueous medium) toward sea floor 14 for impact thereon and penetration thereof. As a result of said impact and penetration, reshaped acoustical echoes 15 thereof are reflected back to the aforesaid depth sounder 11.

Depth sounder 11, as a result of transmitting pulse 12, produces a clock pulse which synchronizes the operation of the remainder of the system from a timing standpoint. Hence, when received, echo 15 is further processed in accordance with the program initiated by said trigger pulse, as will be discussed more fully during the discussion of the operation of the invention presented below.

One of the outputs of depth sounder 11, the echo data signal output, is connected through an adjustable input level control 16 to the input of an emitter follower rectifier 17. The output of emitter follower 17 travels two paths, one of which results from its being connected through a variable amplifier 18 to the input of a detector 19. The output of detector 19 is connected to the input of a filter 21, the output of which is connected to one of the inputs of a comparator circuit 22, which, in this particular instance, is a Schmitt trigger 23.

The output of comparator 22 is taken from the output of Schmitt trigger 23 and is coupled to the input of a differentiator 24, the output of which is connected through a clamper 25 to the input of a variable monostable multivibrator 26. The output of monostable multivibrator 26 is connected to one of the inputs of a subtract network type of Schmitt trigger 27, with the other input thereof connected to the output of an impedance matching voltage divider 28 which, in turn, has its input connected to the output of the aforementioned Schmitt trigger 23.

The output of Schmitt trigger 27 is connected to the input of an integrator 29—which, in fact, is a time-to-voltage converter 31—and the output thereof is connected to the input of a peak voltage memory 32. The output of peak voltage memory 32 is connected through a variable amplifier 33 to the input of a readout 34.

Readout 34 may be of any conventional type that facilitates the indication and/or recording of sea bottom softness or hardness, or any other physical characteristic thereof that is proportional thereto or extrapolated therefrom. Calibration thereof in such terms as is desired could obviously be accomplished by the artisan, in order to facilitate using the invention to an advantage during any given operational circumstances.

The other output of the aforementioned depth sounder 11, the synchronizing clock pulse output, is connected to the input of a variable attenuator 35, with the output thereof connected to the input of a rectifier 36, and with the output thereof, in turn, connected to the input of an adjustable monostable multivibrator 37. The output of monostable multivibrator 37 is connected to one of the inputs of a gate shunt to ground 38, the other input of which is connected to the output of the aforesaid emitter follower rectifier 17.

The output of the aforementioned filter 21 is also connected to the input of a peak detected voltage memory 39 which has a pair of outputs, one of which is connected to one of the inputs of a discharge network 41. Discharge network 41 has its other input connected to the output of said monostable multivibrator 37.

The other output of peak detected voltage memory 39 is coupled to the input of a Darlington emitter follower 42. A voltage divider 43 is connected between the output of Darlington emitter follower 42 and the other input of the aforesaid Schmitt trigger 23 of comparator 22.

The output of Darlington emitter follower 42 is also connected to the input of a monitor memory 44, the output of which is connected through an adjustable amplifier 45 to the input of a monitor device 46.

Like the aforementioned readout 34, monitor 46 may be any suitable device that serves its purpose. It is preferably calibrated to indicate voltages that are proportional to the amplitude of sea floor echoes, but it may be designed to indicate any other appropriate parameter, if so desired. It may, for instance, be located at a place which is remote from readout 34 or even the remainder of the subject system.

It may be worthy of note at this time that all of the elements disclosed in block form in the device of FIG. 1 are conventional per se; therefore, it should be understood that it is their unique interconnections and interactions that effect the subject invention and the improved sea bottom classification results produced thereby.

The operation of the invention will now be discussed briefly in conjunction with both figures of the drawing.

Experimental sound propagation studies have shown that the length of acoustic echo pulses reflected from a sea bottom is a function of bottom softness. This is ostensibly true because the acoustic pulse penetrates the bottom and volume reverberation therewithin causes elongation thereof in proportion to said penetration. Accordingly, within reason and certain limitations, said elongation provides a measure of bottom softness. Thus, if a short narrow beam acoustic pulse is transmitted substantially vertically toward the sea bottom, an echo thereof is received, and the length thereof measured relative to the reference length of the transmitted pulse, by appropriate data signal processing of said echo, its relative length becomes proportional to bottom softness. It has also been ascertained that with transmitted pulses within the lower sonar frequencies the received echo is about the same length as the transmitted pulse for known hard bottoms. For softer bottoms, the received echo length is increased as the softness thereof increases. Of course, a certain degree of softness is sometimes indicative of the type of sea bottom being encountered—that is, for instance, it may be indicative of a rock, sand, or mud bottom, or perhaps even an object laying thereon or buried therein.

To expedite the traverse of any given area and, thus, to increase the speed of any given sea bottom analysis, the subject invention may be carried by any suitable carrier vehicle. Although not illustrated in the drawing, as previously suggested, such a carrier vehicle may be a watercraft, aircraft, landcraft, spacecraft, or any other craft which is capable of having the invention mounted thereon.

For the sake of simplicity of disclosure, it will be assumed that the following operation occurs aboard a ship and the particular material being analyzed is the sea floor.

As schematically depicted in FIG. 1, the transmitter portion of depth sounder 11 broadcasts sonic pulses 12 through sea water 13 in such manner that they will be reflected from sea floor 14 as echoes 15.

Because numerous operations occur within the subject system—some at the same time, some in programmed succession, and some at individual times—the respective timing thereof has been disclosed as $T_0$ through $T_4$ and associated with their respective waveforms in FIG. 2. Moreover, in order to simplify the discussion of said operations, those that occur simultaneously will be discussed together, as well as in their respective sequences.

At time $T_0$, a clock or synchronizing pulse 51 similar to that ideally shown at FIG. 2(A) is generated by depth sounder 11, and simultaneously therewith a CW pulse of acoustical energy similar to pulse 52 of FIG. 2(B) is transmitted or broadcast toward the sea floor. Also, at the same time $T_0$, pulse 51 is supplied to attenuator 35 to change it to a more useful level, after which it is rectified by rectifier 36 to form a positive pulse 53, similar to that shown in FIG. 2(D). Pulse 53 then triggers monostable multivibrator 37 to its unstable state, and a rectangular wave 54 of predetermined width (see FIG. 2(E)) is thus formed, which timely opens gate 38 to shunt the pulse 55 of FIG. 2(C) supplied to the other input thereof to ground, thereby blanking the input to amplifier 18 during the transmission period occurring between $T_0$ and $T_1$.

Of course, as previously suggested, during the transmission period, the aforementioned pulse 52 is being broadcast, and during the broadcast thereof, it is also being passed through input level control 16 and through emitter follower rectifier 17, where, after being buffered and rectified, it has a waveform substantially similar to that illustrated in FIG. 2(C). Said pulse 55 represents the rectified version of CW pulse 52 of FIG. 2(B) and thus pulse 55 of the waveform of FIG. 2(C) is that portion thereof that is shunted to ground by gate 38.

In addition, the leading edge 56 of square wave 54 is used to enable discharge network 41, so that peak detected voltage memory 39 will begin to discharge to zero potential at that time.

The end of the transmitted pulse occurs at time $T_1$, and if it is properly designed and adjusted, monostable multivibrator 37 returns to its stable state potential 57 at that time to effect the turning off of gate 38, thereby ending the blanking of the input of amplifier 18. Also, by time $T_1$, the discharging of the peak detected voltage of memory 39 has ended, as will be more fully discussed below.

Relatively speaking, it takes a while—the amount of time being contingent on the water depth involved—for transmitted pulse 52 to travel to the sea floor and back; hence, at some time $T_2$, reflected echo 58 thereof, shown in FIG. 2(B), is received by the receiver portion of depth sounder 11. This echo 58 is likewise changed to a more useful level by input level control 16, buffered and rectified by emitter follower rectifier 17, and then amplified by amplifier 18 in accordance with whatever gain is set therein. When rectified by rectifier 17, it acquires a waveform 59 similar to that shown in FIG. 2(F), and when this signal is detected by detector 19 and properly filtered at a suitable time constant by filter 21, it acquires a waveform 61 comparable to that depicted in FIG. 2(G).

The leading edge of waveform 61 then triggers Schmitt trigger 23 of comparator 22 to an ON state and produces an output signal 62 like that shown in the waveform of FIG. 2(I). This rectangular wave is then fed to one of the inputs of Schmitt trigger 27. Furthermore, the leading edge of signal 62, after being differentiated by differentiator 24 and clamped by clamper 25 to form a pulse 63, like that shown in the waveform of FIG. 2(J), turns on multivibrator 26 to produce rectangular wave 64 of FIG. 2(K).

At time $T_2$, the charging of memory 39 commences, and it then rapidly charges until the peak voltage of signal 61 of FIG. 2(G) is reached. Due to a very slow discharge rate having been designed therein, memory 39 substantially maintains this peak voltage through very slowly discharges in the manner shown in waveform 65 of FIG. 2(H) until time $T_0$ of the next transmission cycle occurs. At such time, memory 39 is caused to be discharged very rapidly, with the discharge thereof commencing at the time $T_0$ that the leading edge of the following transmission cycle signal of FIG. 2(E) is supplied to the input of discharge network 41. Whatever voltage level exists during the time prior to the discharge of memory 39 is supplied to memory 44, where it is substantially integrated with the preceding similar pulses, so as to supply the average thereof to monitor 46, which is indicative of the amplitude of the received echo signal. Hence, monitor 46 enables an operator to determine whether or not an adequate signal level is being furnished to the data signal input by depth finder 11.

Because monostable multivibrator 26 has been designed to return to its stable state after a period of time approximately equal to the broadcast pulse time, the trailing edge of rectangular wave 64 of the waveform of FIG. 2(K) triggers Schmitt trigger 27 in accordance with rectangular wave 67 shown in FIG. 2(L). But because a suitable preselected controlling voltage level is also supplied through voltage divider 28 from the output of Schmitt trigger 23 while it is ON to the other input of Schmitt trigger 27, Schmitt trigger 27 acts as a subtract circuit and remains ON until the trailing edge of square wave 62 occurs to turn it OFF.

The aforesaid preselected controlling voltage is available at said other input of Schmitt trigger 27 because of voltage level comparison of the signal stored in memory 39. The signal stored therein has the appearance of that shown as signal 65 in the waveform of FIG. 2(H). After traveling through circuit buffering Darlington emitter follower 42, it is reduced to a voltage level which is 0.37 of its original stored level by voltage divider 43. This reduced signal level is then applied to the other input of the aforesaid Schmitt trigger 23, where it acts as the controlling voltage therefor. Thus, in the event the instantaneous input signal voltage level thereto from filter 21 is not sufficiently large to make 0.37 of the maximum peak voltage level of 61 thereof sufficient to enable Schmitt trigger 23, it is turned OFF quite sharply, thereby effectively producing a very rapid fall of the trailing edge of rectangular wave 62 and, hence, 67 of the waveform of FIG. 2(L) at time $T_4$.

Although any suitable voltage reduction may be effected by voltage divider 43, it has been ascertained that reducing the output thereof to 0.37 of the peak detected voltage input thereto and designing Schmitt trigger 23 to be enabled by such value causes any spurious noise or ringing that may still exist in received signal 58 at the end of its reception period to be eliminated for all practical purposes and, hence, do not adversely effect the overall operation of the subject system.

When the inputs to Schmitt trigger 23 have the proper values, a signal similar to signal 62 of the waveform of FIG. 2(I) is produced at the output thereof. This signal is also differentiated and clamped by differentiator 24 and clamper 25, respectively, to form pulse 63 of FIG. 2(J). This signal triggers monostable multivibrator 26 to its unstable state, and rectangular wave 64 of FIG. 2(K) is initiated at the output thereof. Because multivibrator 26 is designed and adjusted to return to its stable state at time $T_3$, the width of rectangular wave 64 represents the approximate same time duration as the aforementioned transmission period. This waveform along with the waveform of signal 62 is applied to the respective inputs of Schmitt trigger 27, which acts as a subtract circuit and produces rectangular wave 67 of FIG. 2(L), which is the difference therebetween.

As previously indicated, the elongation of an echo-ranging signal broadcast received by depth sounder 11 is proportional to the softness of the sea bottom being sampled at that particular instant. However, the softness thereof is not very informative unless it is measured with respect to a reference hardness. It has, as the result of experimental investigation been determined that the width of the received portion of an echo-ranging signal is substantially equal to the width of the transmitted portion thereof when the surface reflecting it is sufficiently hard and solid to allow only a negligible penetration thereof, if any. Hence, at certain frequencies, the duration of the transmitted CW pulse provides a reasonable reference parameter with which a sample surface reflected echo may be compared. Accordingly, rectangular wave 64 (representing the duration of the transmitted pulse) is subtracted from square wave 62 (representing the received echo pulse length) in Schmitt trigger 27 to provide such a referenced softness indicator as rectangular wave.

When this difference square wave 67 is integrated by integrator 29 with respect to time, a voltage curve 68 is obtained that is similar to that portrayed in FIG. 2(M). When the peak value thereof is stored by memory 32, averaged with the peak values of the similar preceding signals and further amplified by amplifier 33, it may be read out as a direct current voltage 69 like that shown in FIG. 2(N) or in terms of a calibrated softness by readout 34 at time $T_4$ of each sampling cycle.

In this particular preferred embodiment, it has been found preferable to include a monitor circuit to facilitate the operation thereof; hence, such a circuit composed of series connected memory 44, amplifier 45, and monitor readout 46 are incorporated therein, in order to insure that the acoustic echoes from the sea floor are of sufficient amplitude to be processed by the remainder of the invention but are not so great as to adversely saturate the electronic components thereof actually accomplishing the processing.

Such monitoring is achieved very simply by effectively observing the stored peak detected voltage of memory 39 which, due to its slow discharge rate (as shown in FIG. 2(H)) supplies a near direct current voltage 71 through memory 44 and amplifier 45 to monitor type readout 46. This voltage, of course, provides a useable indication that proper sea floor sampling is occurring, and if not, that appropriate manual adjustments need to be made to the various adjustable elements of the subject invention to do so. Thus, the monitor circuit tends to optimize the operation of the invention by making it more a compatible adjunct to most any conventional echo-ranging system, radar, sonar, fathometer, or depth sounder, and by increasing the versatility thereof as far as the sea bottom being sampled is concerned.

From the foregoing, it may readily be seen that the subject invention is an exceedingly useful instrument for expeditiously measuring and indicating the relative softness of a sea bottom and for making it possible to more accurately infer some of its physical characteristics therefrom.

What is claimed is:

1. A sea bottom classifier comprising in combination:
   means for broadcasting for a predetermined time period an acoustical signal toward the sea bottom to be classified and for receiving the echo therefrom;
   means connected to an output of the receiving portion of said broadcasting and receiving means for producing a first rectangular signal having a width that is proportional to the time period said acoustical signal is broadcast;
   means connected to an output of the receiving portion of said broadcasting and receiving means for producing a second rectangular signal having a width that is a predetermined proportion of the time period said echo is received;
   means connected to the outputs of said first and second rectangular signal producing means for producing a third rectangular signal having a width that is proportional to the difference between said first and second rectangular signals;
   means connected to the output of said third rectangular signal producing means for producing a direct current voltage that is proportional to the width of said third rectangular signal; and
   means connected to the output of the aforesaid direct current voltage producing means for the reading out thereof.

2. The device of claim 1 wherein said means for broadcasting for a predetermined time period an acoustical signal toward the sea bottom to be classified and for receiving the echo therefrom comprises an echo-ranging system.

3. The device of claim 1 wherein said means for broadcasting for a predetermined time period an acoustical signal toward the sea bottom to be classified and for receiving the echo therefrom comprises a sonar system.

4. The device of claim 1 wherein said means for broadcasting for a predetermined time period an acoustical signal toward the sea bottom to be classified and for receiving the echo therefrom comprises a depth finder.

5. The device of claim 1 wherein said means connected to the outputs of said first and second rectangular signal producing means for producing a third rectangular signal having a width that is proportional to the difference between said first and second rectangular signals comprises:
   a Schmitt trigger having a pair of inputs and an output, with one of the inputs thereof connected to the output of said second rectangular signal producing means; and
   a voltage divider connected between the other input of said Schmitt trigger and output of the aforesaid first rectangular signal producing means.

6. The device of claim 1 wherein said means connected to the output of said third rectangular signal producing means for producing a direct current voltage that is proportional to the width of said third rectangular signal comprises:
   an integrator; and
   a peak voltage memory attached to the output of said integrator.

7. The device of claim 1 wherein said means connected to an output of the receiving portion of said broadcasting and receiving means for producing a second rectangular signal having a width that is proportional to the time period said echo is received comprises:
   an input level control;
   an emitter follower rectifier connected to the output of said input level control;
   a detector effectively connected to the output of said emitter follower rectifier;
   a filter connected to the output of said detector;
   a Schmitt trigger having a pair of inputs and an output, with one of the inputs thereof connected to the output of said filter; and
   means connected between said one input of said Schmitt trigger and the other input thereof for timely supplying a signal thereto that is a predetermined proportion of said one input.

8. The device of claim 7 wherein said means connected between said one input of said Schmitt trigger and the other input thereof for continuously supplying a signal thereto that is a predetermined proportion of said one input comprises:
   a memory connected to said one input of said Schmitt trigger;
   an emitter follower connected to the output of said memory; and
   a voltage divider connected between the output of said emitter follower and the other input of the aforesaid Schmitt trigger.

9. The device of claim 1 wherein said means connected to an output of the receiving portion of said broadcasting and receiving means for producing a first rectangular signal having a width that is proportional to the time period said acoustical signal is broadcast comprises:
   an input level control;
   an emitter follower rectifier connected to the output of said input level control;
   a detector effectively connected to the output of said emitter follower rectifier;
   a filter connected to the output of said detector;
   a comparator having a pair of inputs and an output, with one of the inputs thereof connected to the output of said filter;
   means connected between the output of said filter and the other input of said comparator for timely supplying a signal thereto that is a predetermined proportion of the output signal from said filter;
   a differentiator connected to the output of said comparator;
   a clamper connected to the output of said differentiator; and
   an adjustable monostable multivibrator connected to the output of said clamper.

10. The device of claim 9 wherein said means connected between the output of said filter and the other input of said comparator for timely supplying a signal thereto that is a predetermined proportion of the output signal from said filter comprises:
    a memory connected to the output of said filter;
    an emitter follower connected to the output of said memory; and
    a voltage divider connected between the output of said emitter follower and the other input of said comparator.

11. A sea bottom classifier comprising in combination:
    an echo-ranger for broadcasting a predetermined signal toward the sea bottom to be classified, for receiving the echo therefrom, and for producing a pair of outputs in response thereto, one of which is a clock pulse that occurs simultaneously with the broadcast of said predetermined signal, and the other of which is a data signal representing said echo;
    an input level control connected to said data output of said echo-ranger;
    an emitter follower rectifier connected to the output of said input level control;
    a detector effectively connected to the output of said emitter follower rectifier;

a first Schmitt trigger having a pair of inputs and an output, with one of the inputs thereof effectively connected to the output of said detector;

a variable attenuator connected to the clock pulse output of the aforesaid echo ranger;

a rectifier connected to the output of said variable attenuator;

a first variable monostable multivibrator connected to the output of said rectifier;

a gate shunt to ground effectively connected between the output of said first variable monostable multivibrator and the output of the aforesaid emitter follower rectifier;

a discharge network connected to the output of said first variable monostable multivibrator;

a peak detector voltage memory having an input and a pair of outputs, with the input thereof effectively connected to the output of said detector, and with one of the outputs thereof connected to the other input of the aforesaid discharge network;

an emitter follower connected to the other output of said peak detected voltage memory;

a first voltage divider connected between the output of said emitter follower and the other input of the aforesaid first Schmitt trigger;

a differentiator connected to the output of said first Schmitt trigger;

a clamper connected to the output of said differentiator;

a second variable monostable multivibrator connected to the output of said clamper;

a second Schmitt trigger having a pair of inputs and an output, with one of the inputs thereof connected to the output of said second variable monostable mutivibrator;

a second voltage divider connected between the output of said first Schmitt trigger and the other input of said second Schmitt trigger;

an integrator connected to the output of said second Schmitt trigger;

a peak voltage memory connected to the output of said integrator; and a readout effectively connected to the output of said peak voltage memory.

12. The device of claim 11 further characterized by a filter connected between the output of said detector and said one input of the aforesaid first Schmitt trigger.

13. The invention according to claim 11 further characterized by:

a monitor memory connected to the output of said emitter follower; and a monitor readout effectively connected to the output of said monitor memory.

14. The invention of claim 13 further characterized by:

a first variable amplifier connected between the output of said emitter follower rectifier and the input of the aforesaid detector;

a second variable amplifier connected between the output of said peak voltage memory and the input of the aforesaid readout; and a third variable amplifier connected between the output of said monitor memory and the input of the aforesaid monitor readout.

References Cited
UNITED STATES PATENTS

| | | | |
|---|---|---|---|
| 2,706,285 | 4/1955 | Scott | 340—3 |
| 3,346,067 | 10/1967 | Schroeder | 181—.5 |

RICHARD A. FARLEY, Primary Examiner

U.S. Cl. X.R.

73—67.7; 181—.5